(12) United States Patent
Drane

(10) Patent No.: US 6,930,250 B1
(45) Date of Patent: Aug. 16, 2005

(54) TWO-PIECE SWIVEL HANGER ASSEMBLY

(75) Inventor: Mark R. Drane, Germantown, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 29 days.

(21) Appl. No.: 10/993,551

(22) Filed: Nov. 19, 2004

Related U.S. Application Data

(60) Provisional application No. 60/570,754, filed on May 13, 2004.

(51) Int. Cl.⁷ .............................................. H01H 9/02
(52) U.S. Cl. .......................... 174/58; 174/61; 174/54; 248/343; 52/39
(58) Field of Search ............................. 174/58, 50, 53, 174/59, 61; 248/343, 906; 220/3.8, 3.3, 3.92; 52/39

(56) References Cited

U.S. PATENT DOCUMENTS

| | | | |
|---|---|---|---|
| 5,296,647 A * | 3/1994 | Banker | 174/58 |
| 5,619,263 A * | 4/1997 | Laughlin et al. | 248/343 |
| 5,762,223 A | 6/1998 | Kerr, Jr. | |
| 6,417,449 B1 * | 7/2002 | Perez-Bonifacini | 174/58 |
| 6,646,202 B2 | 11/2003 | Garvin et al. | |
| 6,649,837 B2 | 11/2003 | Garvin | |
| 6,722,621 B2 * | 4/2004 | Johnson | 248/343 |
| 6,734,356 B1 * | 5/2004 | Gretz | 174/58 |
| 6,756,541 B1 * | 6/2004 | Mollick et al. | 174/58 |
| 6,774,304 B1 * | 8/2004 | Gretz | 174/50 |
| 6,794,573 B1 * | 9/2004 | Ofcharsky et al. | 174/58 |

* cited by examiner

Primary Examiner—Dhiru R. Patel
(74) Attorney, Agent, or Firm—Hoffmann & Baron, LLP

(57) ABSTRACT

A two-piece swivel hanger assembly generally includes a mounting plate mountable to an electrical outlet box, a swivel element and an access door slidably attached to the mounting plate. The mounting plate has a central opening forming at least part of a swivel element seat and has a portion thereof removed to define an access opening within the mounting plate. The swivel element is movably seated in the swivel element seat and partially protrudes through the central opening of the mounting plate. The access door is sized and shaped to fully cover the access opening of the mounting plate when the access door is in a closed position and is further slidable on the mounting plate in a radial direction toward the central opening to the closed position thereby movably retaining the swivel element within the swivel hanger assembly.

20 Claims, 11 Drawing Sheets

TWO-PIECE SWIVEL HANGER ASSEMBLY

CROSS-REFERENCE TO RELATED APPLICATIONS

This application claims the benefit of U.S. Provisional Application No. 60/570,754, filed on May 13, 2004.

FIELD OF THE INVENTION

The present invention relates generally to mounting plates for mounting a fixture, such as a lighting fixture or a ceiling fan, to a ceiling electrical outlet box. More particularly, the present invention relates to a new two-piece concept for a swivel hanger assembly which allows the installer to hang a fixture from one of the pieces of the mounting plate while making the necessary electrical connections.

BACKGROUND OF THE INVENTION

The use of swivel fixture hanger assemblies to hang heavy lighting fixtures and ceiling fans from the ceilings of buildings is well known. Most prior art swivel fixture hanger assemblies for mounting a fixture to a ceiling electrical outlet box generally consist of a flat mounting plate sized to fully cover the outlet box. The mounting plate usually has a central dish shaped seat portion and opening for receiving a swivel ball connector seated therein. Lighting fixtures and ceiling fans are typically hung from a shaft connected to the swivel connector so that the lighting fixture or ceiling fan is capable of some movement. In particular, the swivel connector is designed to compensate for some movement of these types of electrical fixtures while in service by allowing a short range of motion within the swivel hanger assembly. The swivel or ball and socket type connection of these assemblies can compensate for the vibrations associated with the movements of a ceiling fan, or compensate for movement of the structure supporting the assembly.

Typically, such conventional swivel hanger assemblies require the installer to somehow temporarily support the fixture in a manner which allows access to the electrical wiring of both the fixture and the outlet box so that the necessary electrical connections can be made therebetween. Usually, the simplest and safest way to accomplish this is to have a second installer hold the fixture while the first installer makes the necessary electrical connections. Alternatively, the fixture may be temporarily perched on top of a ladder during electrical installation and prior to structurally mounting. The obvious drawbacks of each scenario include the need for two installers and the possibility of the fixture falling off the ladder.

It has been proposed to provide such swivel hanger assemblies with a means for temporarily securing the fixture to the box in a way which enables the installer to make the electrical connections between the fixture and the outlet box prior to mounting the fixture to the box structure. For example, one style of swivel hanger assembly disclosed in U.S. Pat. No. 6,646,202 provides a hinged pivoting gate which allows the installer to hang the fixture from the outlet box in order to first make the necessary electrical connections. Once electrically connected, the fixture may be structurally mounted to the box by pivotably closing the gate. However, disadvantages of this design include costly construction and requiring the installer to "punch" in a metal tab to retain the swivel ball element within the mounting plate.

It is therefore desirable to provide a swivel hanger assembly for mounting a fixture to a ceiling outlet box that not only provides the installer with the ability to pre-hang the fixture to the box to make the necessary electrical connections between the fixture and the outlet box, but is also simply designed and relatively inexpensive to manufacture.

SUMMARY OF THE INVENTION

A two-piece swivel hanger assembly formed in accordance with the present invention generally includes a mounting plate mountable to an electrical outlet box, a swivel element and an access door slidably attached to the mounting plate. The mounting plate has a central opening forming at least part of a swivel element seat and has a portion thereof removed to define an access opening within the mounting plate. The swivel element is movably seated in the swivel element seat and partially protrudes through the central opening of the mounting plate. The access door is sized and shaped to fully cover the access opening of the mounting plate when the access door is in a closed position and is further slidable on the mounting plate in a radial direction toward the central opening to the closed position thereby movably retaining the swivel element within the swivel hanger assembly.

In a preferred embodiment, the access door is movable between the closed position and an open position, wherein the access opening of the mounting plate is uncovered when the access door is in the open position thereby providing access to electrical wiring within the electrical outlet box. The access door preferably includes a radially oriented slot formed therethrough and the mounting plate includes a fastener, such as a screw, threadably fastened thereto. The fastener is slidably seated within the slot of the access door and can be tightened to secure the access door in the closed position. The fastener permits the access door to be first slid radially outwardly from the closed position away from the swivel element and then pivoted away from the access opening of the mounting plate to an open position thereby uncovering the access opening to provide access to electrical wiring within the electrical outlet box. The fastener also permits the access door to hang from the mounting plate in the open position. Alternatively, the slot of the access door may be keyhole shaped to permit detachment of the access door without removing the fastener. In either embodiment, the slot preferably includes a deformation formed therein which engages the fastener for preventing the access door from being slid radially outwardly when the fastener is tightened.

The mounting plate further preferably includes at least one tab formed thereon, wherein the access door is slidable under the tab to be retained thereby in the closed position. Also, the swivel element preferably includes a relieved portion facing the access opening of the mounting plate for providing additional access to electrical wiring within the electrical outlet box. The swivel element further preferably includes structure which cooperates with structure formed on the swivel element seat to preventing the swivel element from excessive movement. The access door further preferably includes a domed portion and the mounting plate includes a cup portion, wherein the domed portion and the cup portion together form the swivel element seat.

Thus, the access door can be moved with respect to the mounting plate between an open position wherein the access door hangs from the mounting plate away from the access opening thereby leaving the access opening uncovered, an intermediate position wherein the access door substantially covers the access opening of the mounting plate and a closed position wherein the access door retains the swivel element within the swivel hanger assembly. Preferably, the access door is pivotable in multiple directions about a pivot point of the mounting plate between the open position and the intermediate position and radially slidable with respect to the pivot point between the intermediate position and the closed position.

The present invention further involves a method for mounting a hanging fixture to an electrical outlet box. The method includes the steps of mounting a mounting plate to a bottom open face of an electrical outlet box, attaching a swivel element to the hanging fixture, hanging the swivel element from the mounting plate, electrically connecting wiring within the electrical outlet box to the hanging fixture, moving an access door about a fastener of the mounting plate into an intermediate position wherein an access opening of the mounting plate is substantially covered by the access door and sliding the access door radially inward with respect to the fastener toward the swivel element to retain the swivel element within the mounting plate. In a preferred method, the access door is moved in more than one direction about the fastener of the mounting plate into the intermediate position.

As a result of the present invention, the installer of a ceiling fixture is provided with a means of securing the fixture to an electrical outlet box in a manner that provides the installer with easy access to the fixture wiring so that the required electrical connections may be made before finally closing the mounting plate onto the electrical outlet box. Thus, the installer does not need a helper to hold the fixture while the electrical connections are made and, therefore, only one person is needed to install the fixture. Moreover, the fixture is safely secured to the outlet box while the electrical connections are made thereby minimizing the chances of dropping and damaging the fixture.

A preferred form of the two-piece swivel hanger assembly, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENTS

Figure 1:
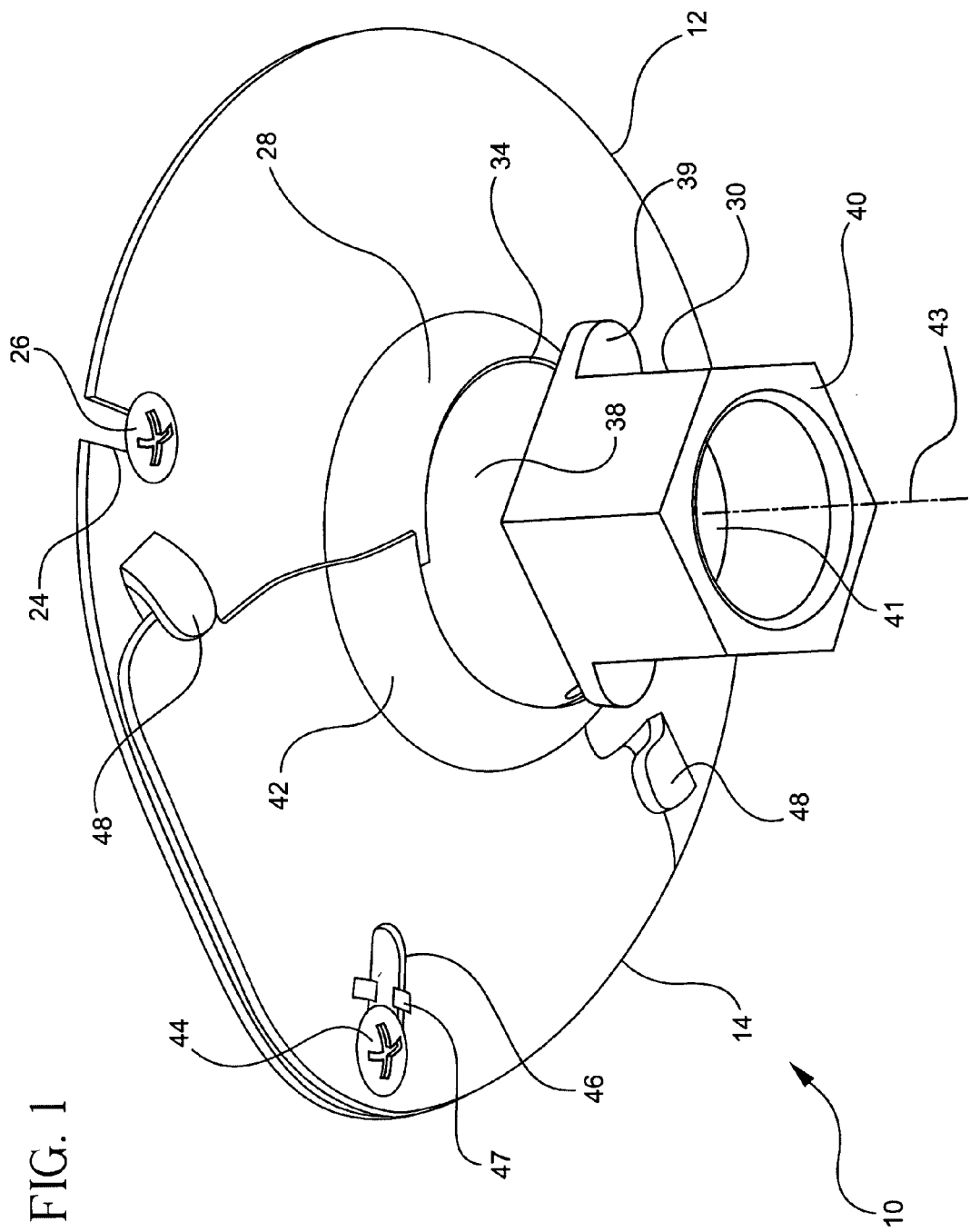
FIG. 1 is a bottom perspective view of the two-piece swivel hanger assembly of the present invention in a circular embodiment.

Referring to the drawings, the two-piece swivel hanger assembly 10 of the present invention generally includes a mounting plate 12 and an access door 14 movably connected to the mounting plate. The mounting plate 12 and the access door 14 may be made from any conventional electrical outlet box material, such as galvanized steel. As will be discussed in further detail below, the mounting plate 12 is designed to be mounted to a conventional electrical conduit or outlet box 16 having electrical wiring 18 from a power source terminating therein, as shown in FIG. 6.

The mounting plate 12 is a generally flat member having a portion removed therefrom to form an access opening 20. The mounting plate 12 further includes a mounting hole 22 and a notch 24 formed opposite the mounting hole for mounting the plate to an electrical outlet box 16 with screws 26. The mounting hole 22 is preferably key-hole shaped so as to permit pre-installing the screw 26 to the outlet box 16 and subsequently engaging and locking the mounting plate 12 to the screw. The notch 24 permits lateral final adjustment of the mounting plate 12 with respect to the outlet box 16 upon installation.

The mounting plate 12 also includes a semi-spherical cup portion 28 formed generally in the center of the plate for receiving and retaining a swivel element 30 to which the fixture is attached. The cup portion 28 is generally an integral arcuate portion of the mounting plate 12 which protrudes outwardly from the bottom surface of the plate. The mounting plate cup portion 28 includes a semi-spherical inner surface 32 and a semi-circular opening 34 through which the swivel element 30 extends. The cup portion 28 is also discontinuous and includes a cut-away portion or gap 36 which communicates with the opening 20 of the mounting plate 12. The gap 36 in the cup portion 28 preferably spans no more than about ⅓ of the full perimeter of the cup portion so that the swivel element 30 can be fully supported in the cup portion despite the gap.

Figure 6:
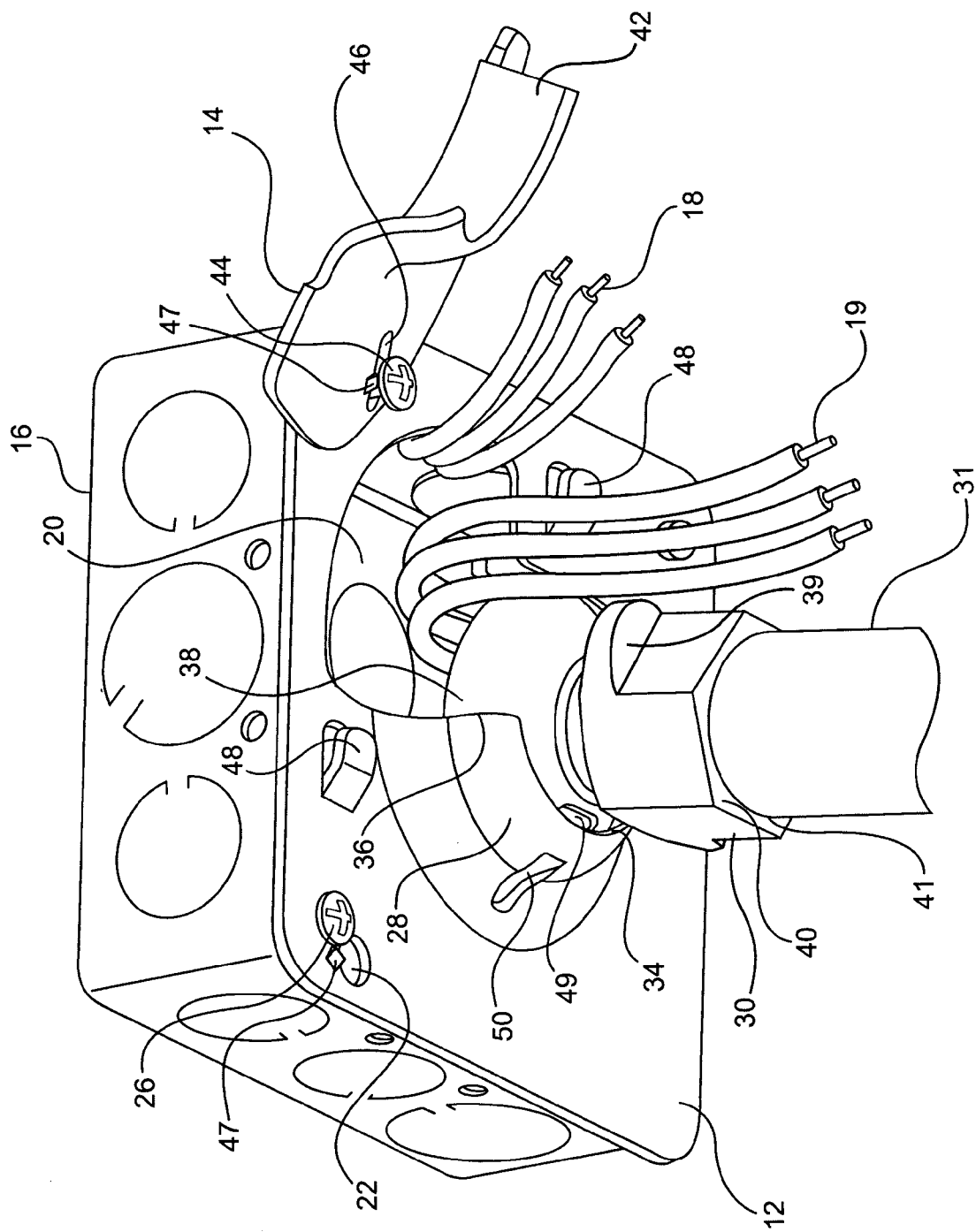
FIG. 6 is a bottom perspective view of the two-piece swivel hanger assembly of the present invention in a rectangular embodiment and with a fixture attached.

The swivel element 30 preferably includes a hollow spherical swivel ball 38 and a connector 40 for attaching the fixture 31 to the swivel element, as shown in FIG. 6. The swivel ball 38 and the connector 40 include a central round hole 41 to allow an electrical fixture's wiring 19 to be inserted therethrough so as to be connected to the wiring 18 of the electrical conduit box 16. The connector 40 of the swivel element 30 has a neck portion that is generally sized to fit through the semi-circular opening 34 of the mounting plate cup portion 28. Connector 40 also has several exterior flat faces to allow an installer to grip the connector with a pair of pliers. The connector portion 40 further preferably includes one or more radially outwardly extending tab-like projections 39 disposed adjacent the swivel ball portion 38 to prevent the swivel element 30 from being pushed upwardly into the electrical outlet box when in use. Also, the interior cavity 41 of the connector 40 has a set of female threads for connecting an electrical fixture 31 directly to the swivel connector or by way of a shaft connected to the electrical fixture.

The swivel ball 38 is sized and shaped to cooperate with the semi-spherical inner surface 32 of the mounting plate cup portion 28 and has a maximum diameter that is slightly larger than the diameter of the mounting plate semi-circular opening 34. As will be discussed in further detail below, the swivel element 30 can be first attached to a fixture 31 and then seated in the mounting plate cup portion 28 by lifting the swivel element 30 until the narrower neck portion of the connector 40 can pass through the access opening 20 of the mounting plate 12 and the cut-away portion 36 of the cup portion. Afterwards, the swivel element 30 is lowered until the swivel ball 38 rests against the semi-spherical inner surface 32 of the cup portion and the connector portion 40 extends through the semi-circular opening 34. The swivel element 30 is thus slidably seated within the mounting plate 12 such that the swivel ball 38 rests against the semi-spherical inner surface 32 of the mounting plate cup portion 28 on one side of the mounting plate and the swivel connector 40 extends through the circular opening 34 of the cup portion on the other side of the mounting plate. In this manner, when fully assembled, the angular orientation of the swivel connector 40 can vary to permit the fixture 31 attached to the swivel element 30 to freely swing through a defined arc about the electrical outlet box 16.

As mentioned above, movably attached to the outside surface of the mounting plate 12 is an access door 14. The access door 14 also includes a domed portion 42 shaped to mate with the cup portion 28 of the mounting plate when the door 14 is attached thereto and said domed portion and cup portion together forming a swivel element seat. As will be discussed in further detail below, the access door 14 is sized to cover or close the access opening 20 of the mounting plate 12 when the access door is in its closed position. Conversely, when the access door 14 is moved away from the access opening 20 of the mounting plate 12 in its open position, an installer is provided access to the interior of the electrical outlet box to easily make the necessary electrical connections between the wiring 18 of the electrical outlet box and the wiring 19 of the fixture attached to the mounting plate. Thus, the access door 14 is movable from an open position, revealing the opening 20 of the mounting plate 12, to a closed position, covering the opening of the mounting plate.

The access door 14 is preferably attached to the mounting plate 12 via a fastener 44. The fastener 44, such as a screw, is threadably attached to the mounting plate 12 and is received within a radially oriented slot 46 formed through the access door 14 to allow inward and outward radial movement of the access door with respect to the center axis of the circular mounting plate cup portion 28. The slot 46 preferably includes one or more raised protrusions or deformations 47 which engage the head of the fastener 44 when tightened to prevent the access door 14 from being slid outwardly after the door is secured to the mounting plate 12 in its closed position. Such deformations 47 may also be provided on the mounting hole 22 of the mounting plate 12 to prevent the mounting plate from rotating with respect to the electrical outlet box 16 once the mounting screws 26 are tightened securely.

Additionally, the mounting plate 12 further preferably includes at least one tab 48 formed therein, which captures and retains an edge of the access door 14 when the access door is slid inwardly into its closed position. The retaining tab 48 may simply be a small partially cut-out portion of the mounting plate 12 that is bent or otherwise displaced outwardly from the plate to define a pocket that can receive and retain an edge of the access door 14.

Figure 2:
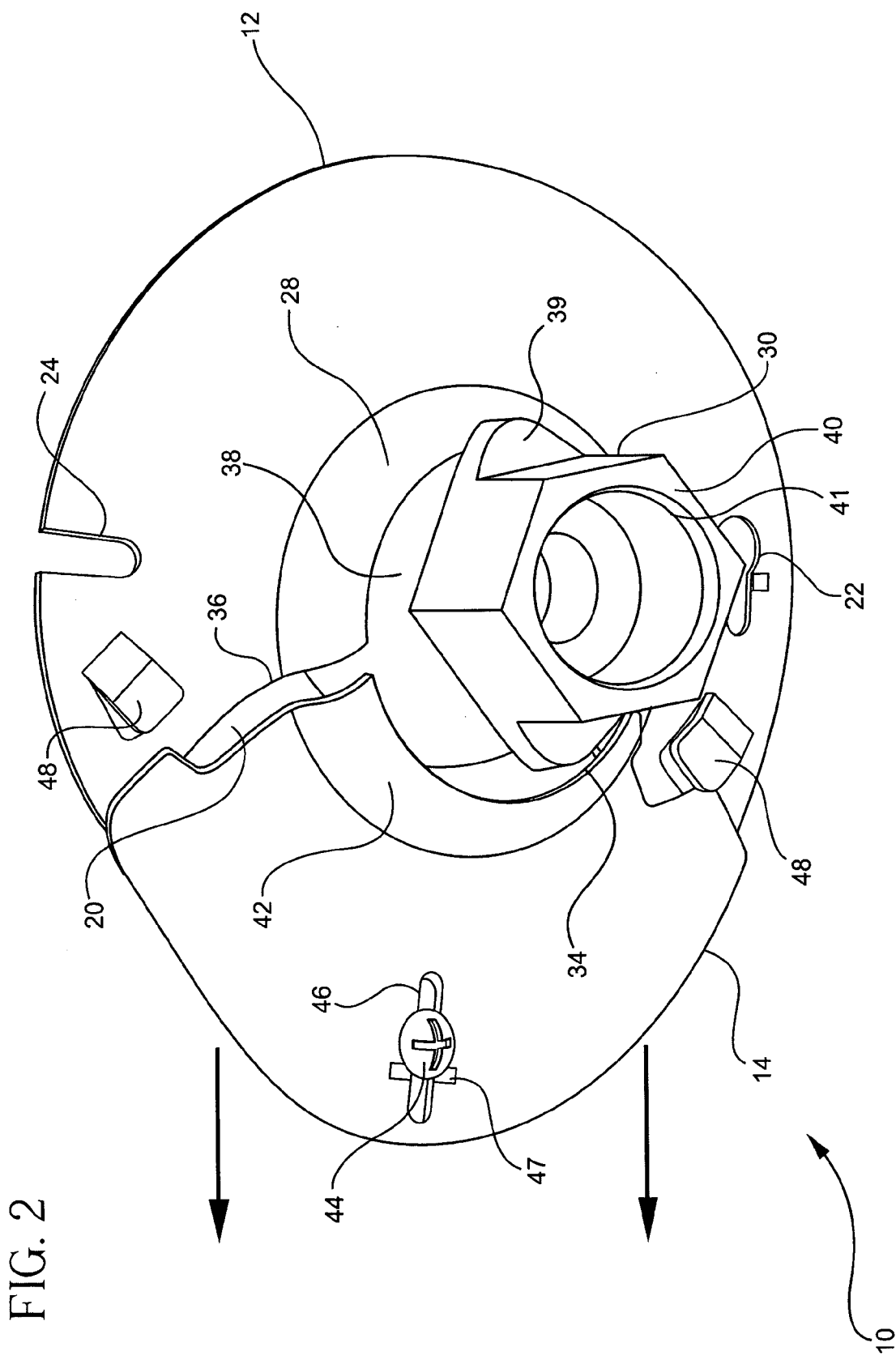
FIG. 2 is a bottom perspective view of the two-piece swivel hanger assembly of FIG. 1 shown with the access door being slid outwardly to allow movement of the access door.
Figure 3:
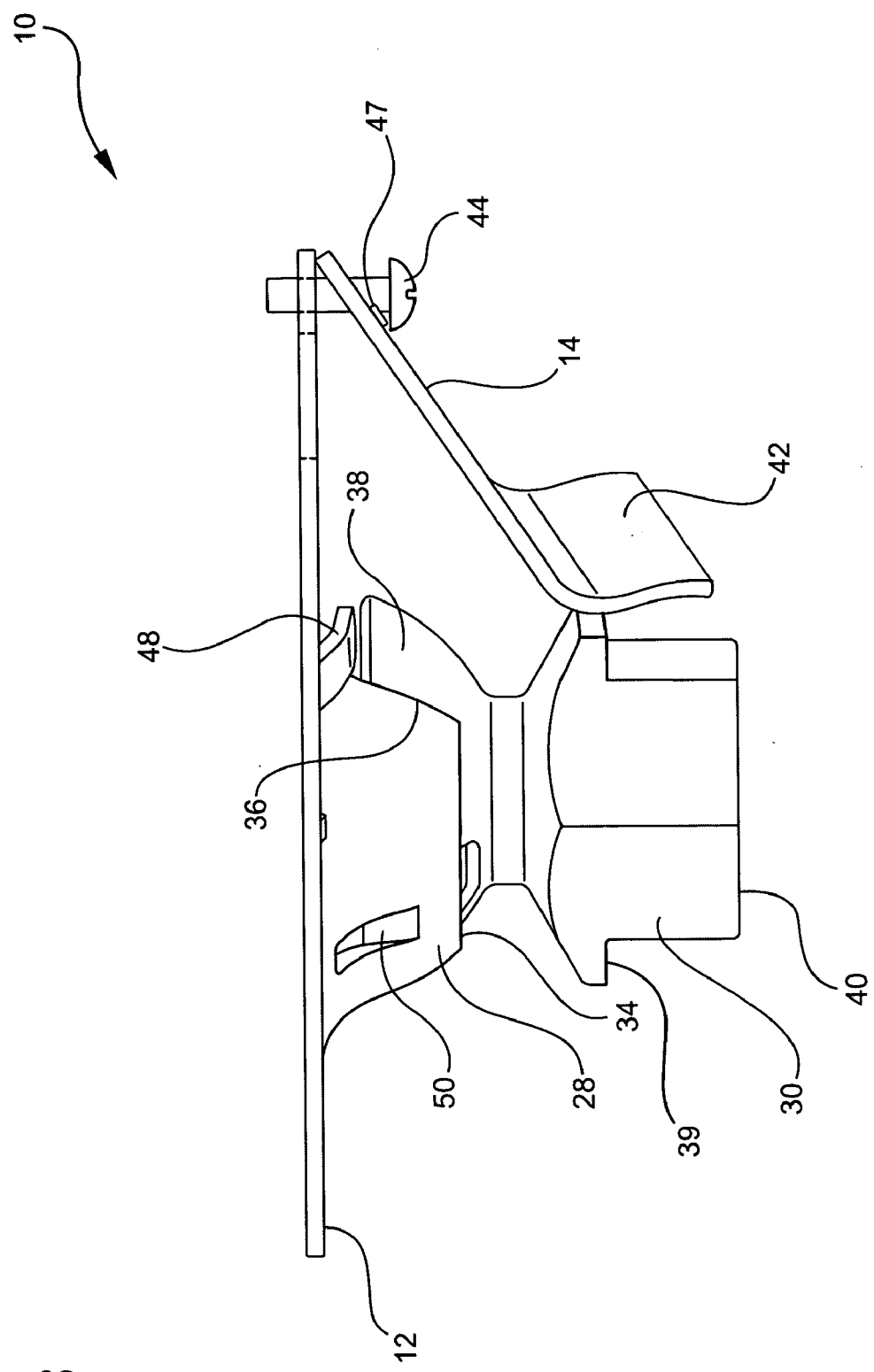
FIG. 3 is a side view of the two-piece swivel hanger assembly of FIG. 1 shown with the access door dropped into an open position.

In operation, to gain access to the interior of the electrical conduit box 16, the fastener 44 is loosened and the access door 14 is first slid radially outwardly from its closed position so as to disengage the door edges from the retaining tabs 48 of the mounting plate 12, as shown in FIG. 2. The door is now in an intermediate position wherein the access opening 20 of the mounting plate 12 is still covered. Once the access door 14 is freed from the retaining tabs 48 of the mounting plate 12, the door can then be dropped and left to hang downwardly from the fastener 44, as shown in FIG. 3. At this point, the access opening 20 of the mounting plate 12 is uncovered thereby providing access to the swivel element 30 and the interior of the electrical outlet box. In particular, with the access door 14 hanging from the fastener 44 of the mounting plate, as shown in FIG. 3, the swivel element 30 can be removed and reinstalled and the necessary electrical connections between the fixture and the electrical outlet box can be made.

Figure 4:
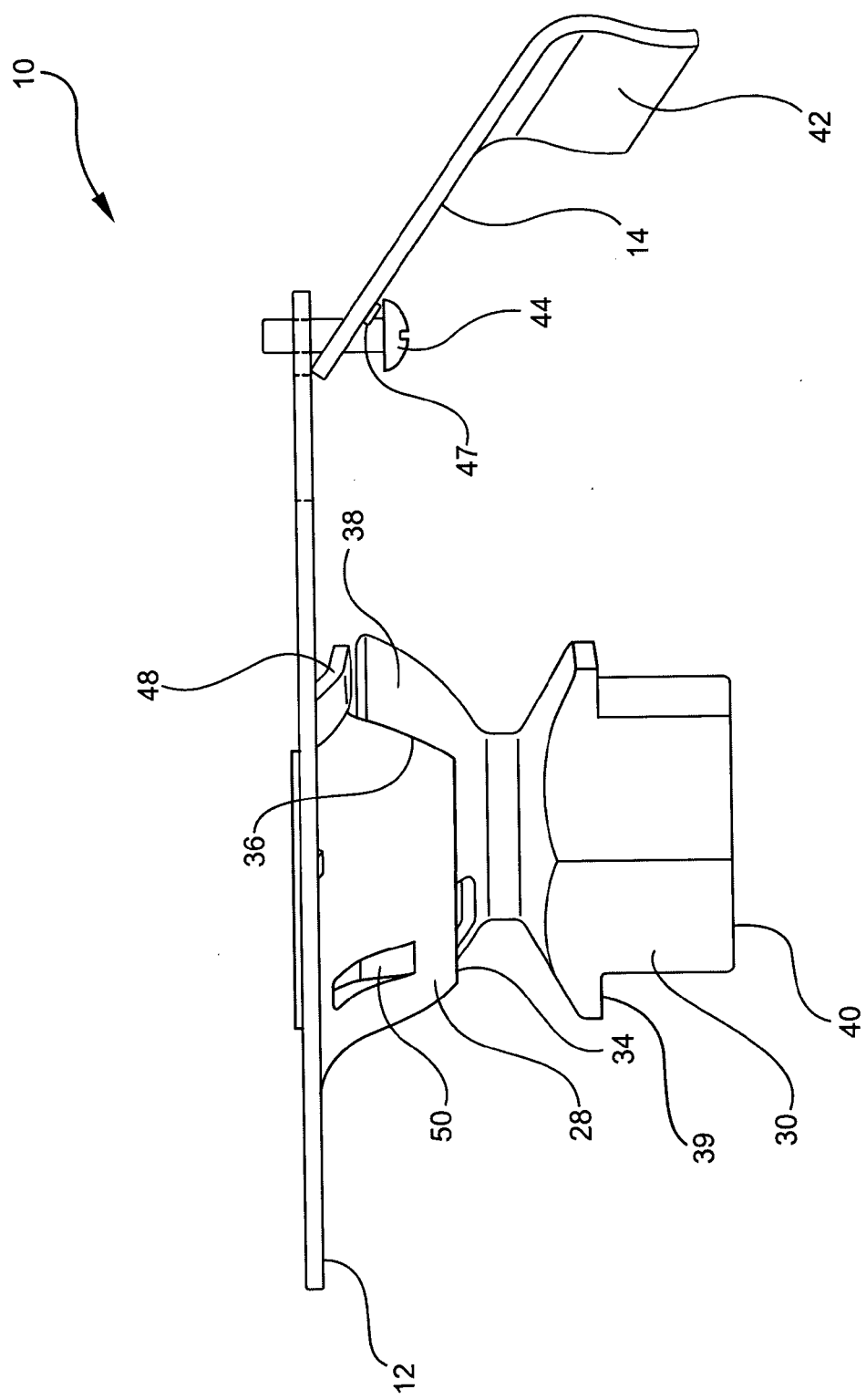
FIG. 4 is a side view of the two-piece swivel hanger assembly of FIG. 1 shown with the access door moved further away from the mounting plate access opening to provide additional clearance.
Figure 5:
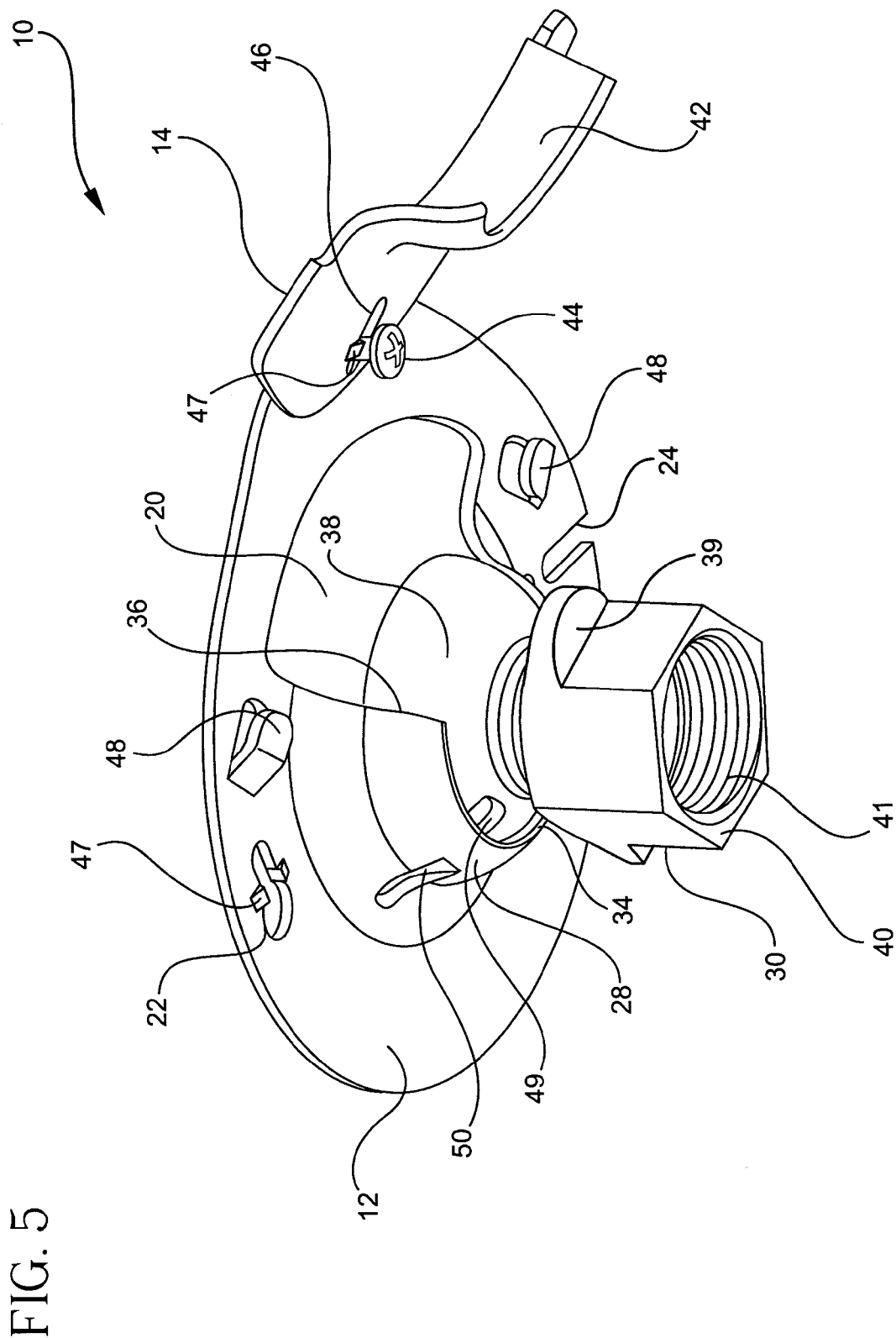
FIG. 5 is a bottom perspective view of the two-piece swivel hanger assembly of FIG. 4.

However, to provide additional clearance to the interior of the electrical outlet box, the access door 14 can be further moved away from the mounting plate access opening 20 while still hanging from the fastener 44, as shown in FIGS. 4 and 5. This provides the installer with additional clearance to the interior of the electrical box while still retaining the access door 14 on the mounting plate 12. Once all the necessary electrical connections between the fixture and the electrical outlet box are made, the above steps are reversed wherein the access door 14 is returned to its intermediate position over the access opening 20 of the mounting plate 12 and the access door is slid inwardly into its closed position to be retained by the mounting plate retaining tabs 48. The access door 14 may then be finally secured to the mounting plate 12 by tightening the fastener 44.

It can be appreciated that the shape of the mounting plate 12 and the shape of the sliding access door 14 complement each other so as to form a substantially continuous member that fully covers the bottom opening of the electrical outlet box 16 when the access door is in its closed position. The mounting plate 12 shown in FIGS. 1–5 has a slightly elongated circular shape so that the access door fastener 44 will be situated outside the perimeter of a standard circular electrical box. Of course, the mounting plate 12 may simply be circular so that the access door fastener 44 will be situated within the perimeter of a standard circular electrical box.

Moreover, while a round shaped mounting plate 12 has been shown and described thus far, it is contemplated that the mounting plate and the access door 14 may take any complementary shapes so as to cover other than round shaped electrical outlet box openings. For example, the mounting plate 12 and the access door 14 may be complementary shaped to form a square, as shown in FIG. 6, or any other shape depending on the opening of the electrical outlet box 16. The only requirement is that the bottom opening of the electrical outlet box be substantially covered according to local building codes when the plate 12 is mounted to the box 16 and the access door 14 is in its closed position.

Figure 7:
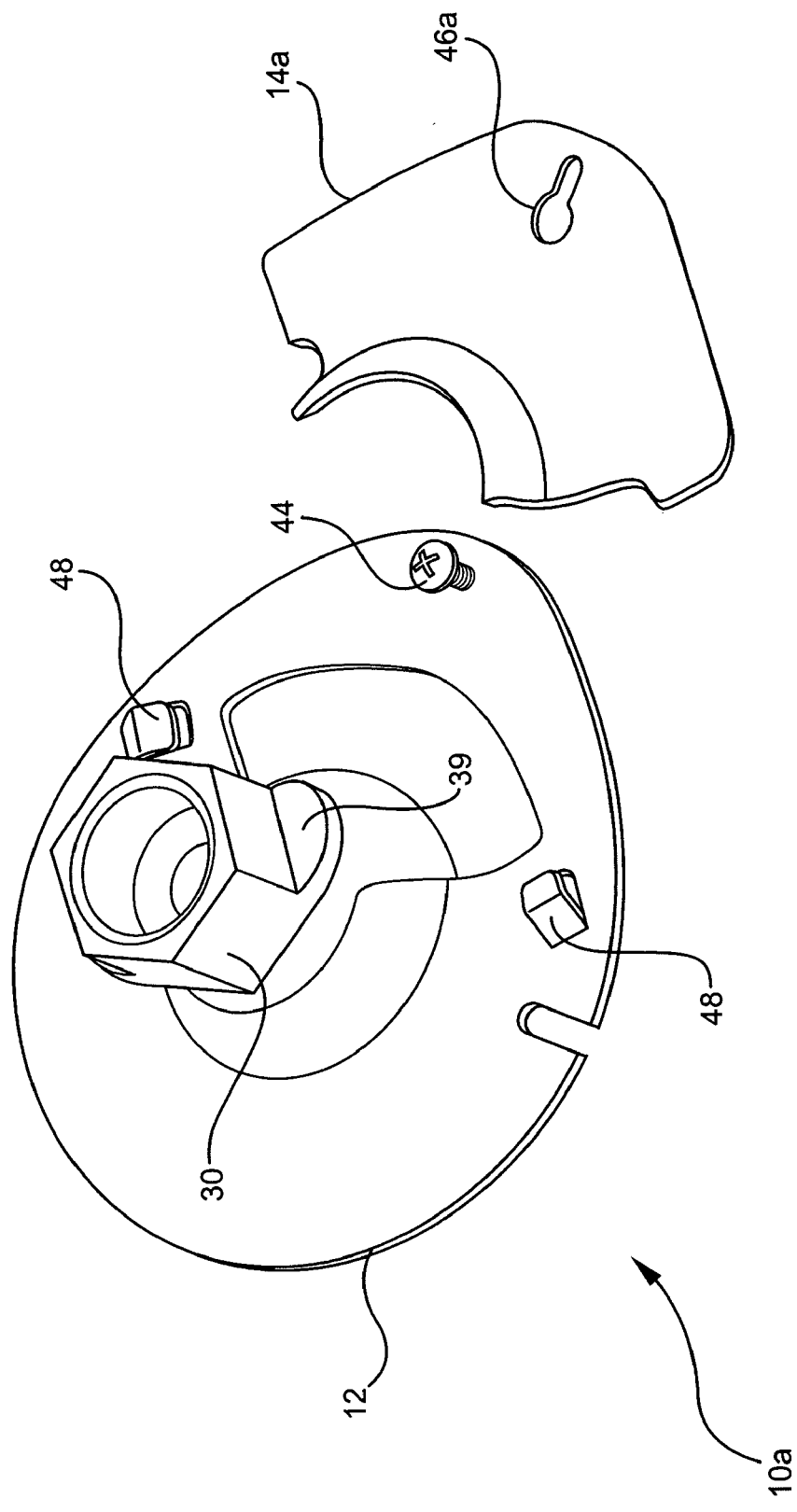
FIG. 7 is a bottom perspective view of an alternative embodiment of the two-piece swivel hanger assembly of the present invention with a detachable access door.
Figure 8:
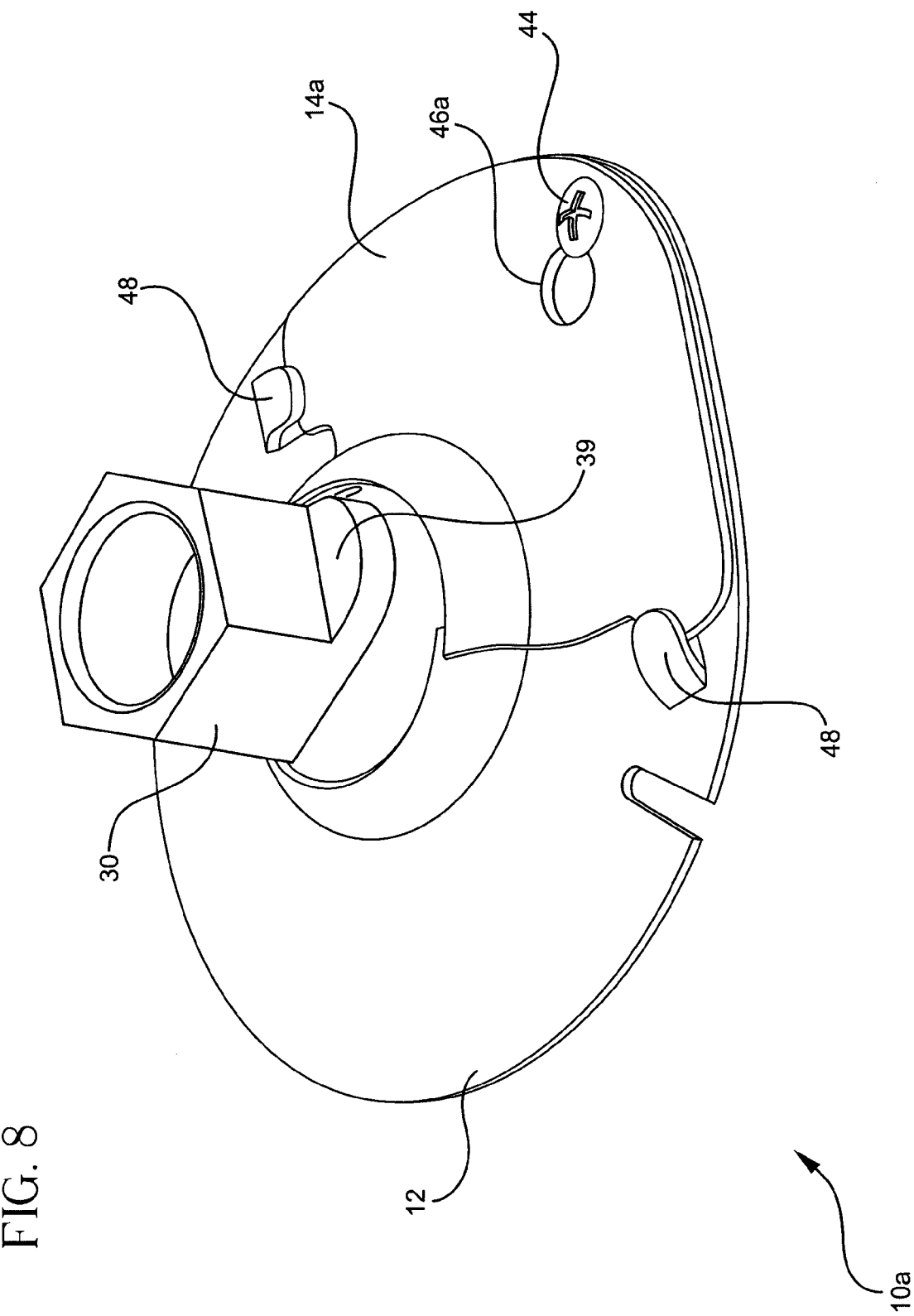
FIG. 8 is a bottom perspective view of the two-piece swivel hanger assembly of FIG. 7 with the access door in its closed position.

FIGS. 7 and 8 show an alternative embodiment 10a of the present invention. While the access door 14 described above can be removed from the mounting plate 12 by simply unscrewing the fastener 44 from the mounting plate, the access door 14a shown in FIG. 7 includes a keyhole-shaped slot 46a which permits the access door 14a to be detached from the mounting plate 12 without removing the fastener 44. In particular, the keyhole-shaped slot 46a includes an opening that is wide enough to allow the head of the fastener to pass therethrough and a narrower slot portion which retains the fastener head. As a result, the fastener 44 can be pre-installed on the mounting plate 12 and the access door 14a can be subsequently hooked onto the fastener. The access door 14a is then slid radially inward, as described above and shown in FIG. 8, wherein the retaining tabs 48 capture the edges of the door. The fastener 44 is then tightened to secure the door 14a in its closed position.

Figure 9:
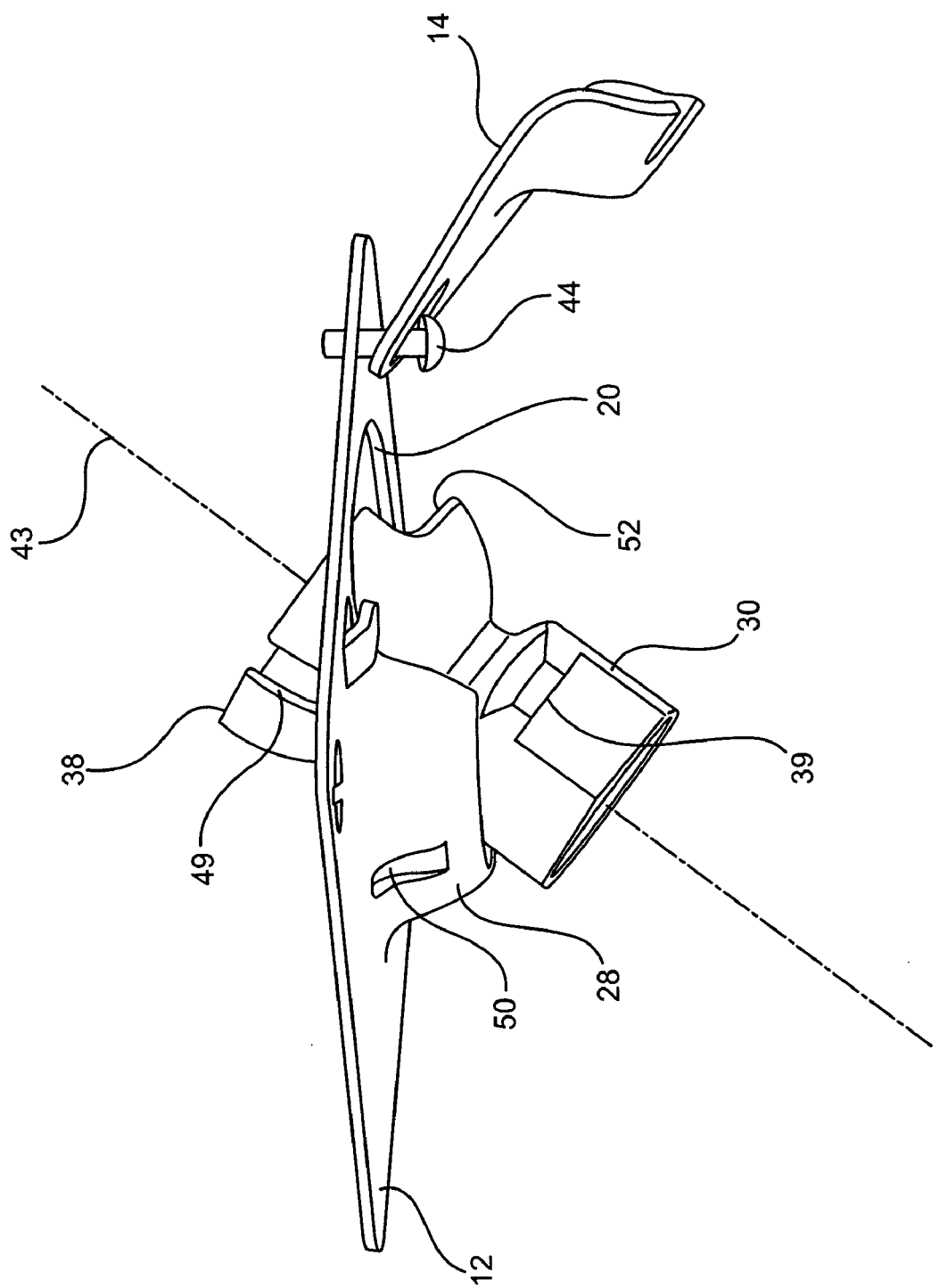
FIG. 9 is a side view of the two-piece swivel hanger assembly of the present invention showing the structure that prevents the swivel ball from rotating after the fixture is hung.
Figure 10:
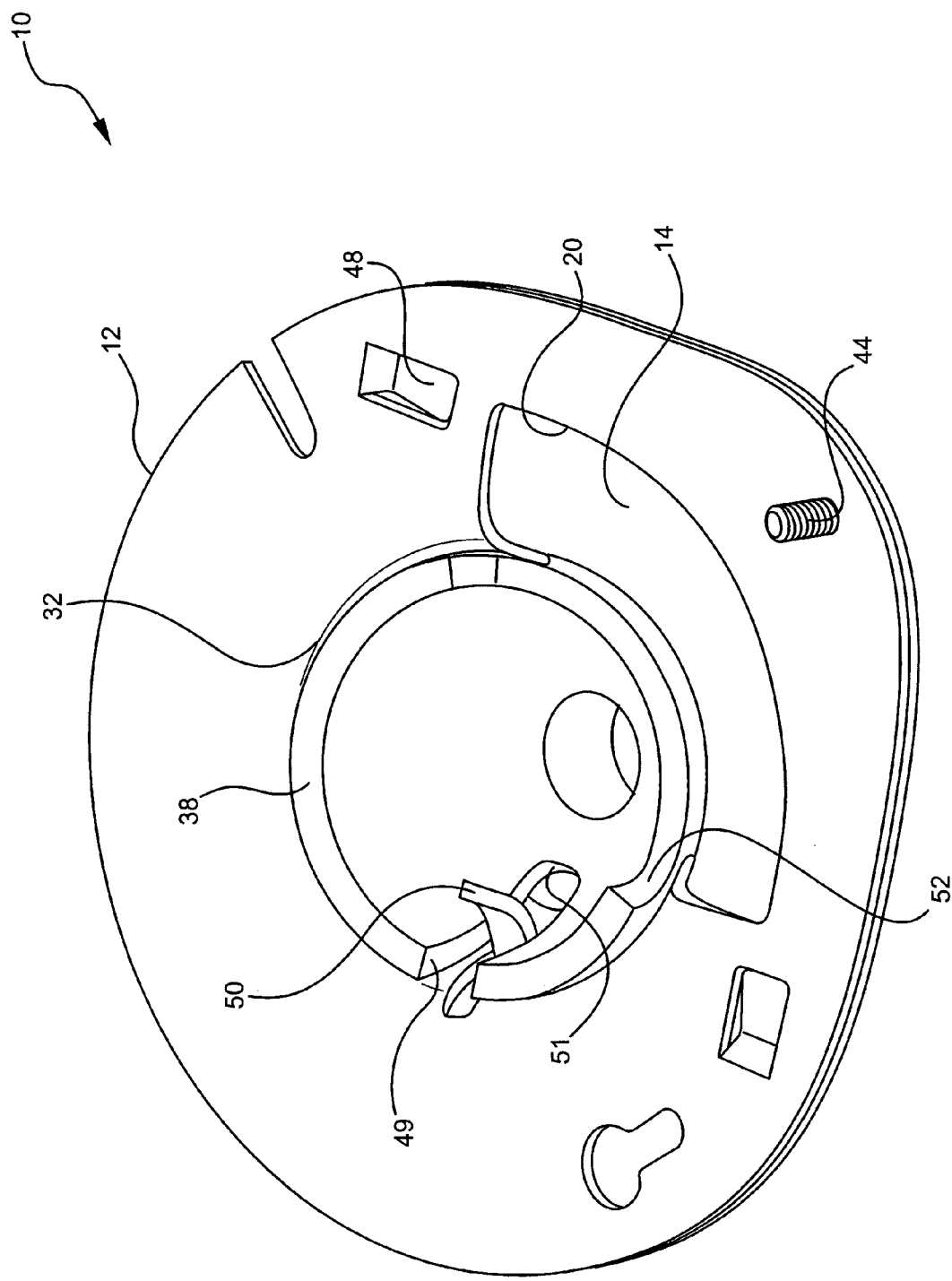
FIG. 10 is a top perspective view of the two-piece swivel hanger assembly of the present invention showing the structure that prevents the swivel ball from rotating after the fixture is hung.
Figure 11:
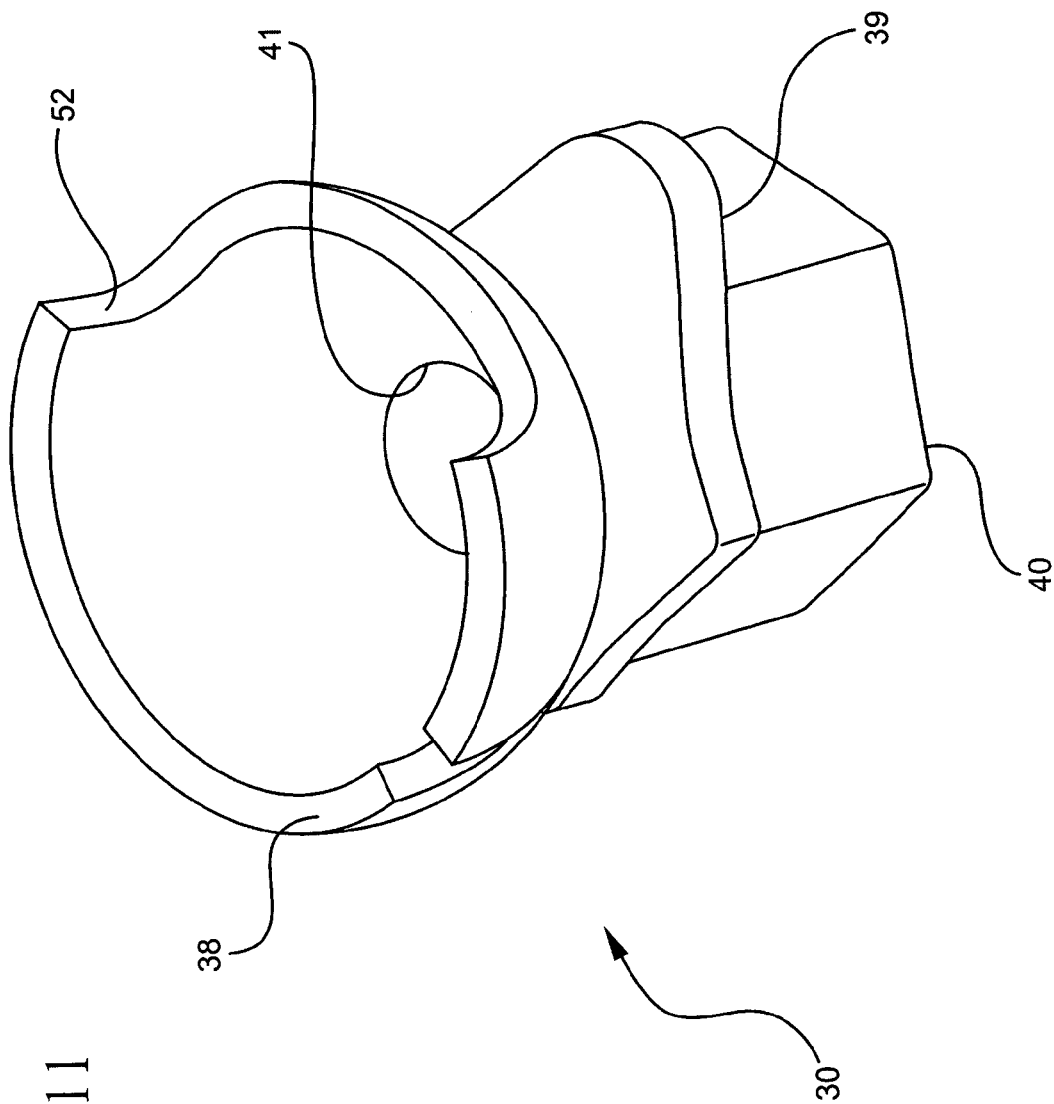
FIG. 11 is a top perspective view of the swivel ball element having a portion thereof removed to provide additional access to the fixture wiring threaded therethrough.

While it is desirable to provide a swiveling feature to the hanger assembly 10, the swivel element 30 should also be prevented from rotating about its axis and/or lifting out of the mounting plate cup portion 28 to thereby avoid twisting, disconnecting and/or damaging the wiring 18 and 19 within the electrical box 16. This can be achieved in the present invention by forming a slot 49 in the swivel ball 38 that engages a swivel ball retaining tab 50 formed in the mounting plate cup portion 28, as best seen in FIGS. 9–11. The swivel ball retaining tab 50 may be a perforated portion of the mounting plate cup portion 28 that is bent or folded inwardly by the installer with, for example, a screwdriver or other tool upon installation. The slot 49 has a length extending along a portion of the periphery of the swivel ball 38 and terminates at a wall 51 so as to permit full angular swiveling of the ball. However, if the swivel element 30 starts to rotate about its longitudinal axis 43, the locking tab 50 of the mounting plate cup portion 28 will make contact with the inner side surface of the slot 49 and stop any further rotation. Additionally, if the swivel element 30 starts to lift up out of the mounting plate cup portion 28, the locking tab 50 of the mounting plate cup portion will make contact with end wall 51 of the slot 49 and stop any further lifting. The relationship between the sizes of the tab 50 and the slot 49 may allow for some flexibility but will prevent damage to the internal wiring.

FIG. 9 further illustrates the installation and/or removal of the swivel element 30 within the mounting plate cup portion 28 with the access door 14 moved away from the mounting plate access opening 20. Generally, the swivel element 30 is tilted at an angle so that the swivel ball 38 can clear the mounting plate access opening 20 and the mounting plate cup portion 28 during insertion/removal. Once inside the mounting plate access opening 20, the swivel ball 38 can be rested within the inner surface 32 of the mounting plate cup portion 28.

As discussed above, the present invention allows the access door 14 to be moved away from the mounting plate access opening 20, to provide additional clearance to the interior of the electrical outlet box, while still hanging from the mounting plate 12. To provide even further access to the fixture wiring 19 threaded through the swivel element 30, the swivel ball 38 further preferably includes a relieved portion 52 which faces the mounting plate access opening 20 when the swivel element is seated within the mounting plate cup portion 28, as shown in FIGS. 9–11. The relieved portion 52 of the swivel ball 38 is simply a portion of the swivel ball spherical surface that has been removed to provide additional access to the wiring 18 and 19 within the electrical box.

Having described the components of the two-piece swivel hanger assembly 10 in detail, the use of the hanger assembly in mounting a fixture to an electrical outlet box 16 may now be described with respect to the drawings. As mentioned above, an installer first mounts the mounting plate 12 directly to the electrical outlet box 16 using screws 26 inserted through the key-hole 22 and the notch 24. The screws 26 may be loosely tightened to permit some final adjustment after the fixture has been mounted. The access door 14 can then be disengaged from the mounting plate 12 by loosening the access door fastener 44 and sliding the access door radially outwardly into its intermediate position, as shown in FIG. 2. The access door fastener 44 must be loosened enough to not only allow the access door slot protrusions 47 to clear the head of the fastener, but also to permit the access door to be moved free of the swivel element 30, as shown in FIGS. 3–5. In particular, when loosened, the access door fastener 44 allows the access door 14 to hang from the mounting plate 12 at an angle, as shown in FIG. 3, to reveal the mounting plate access opening 20 in the mounting plate 12 and thereby provide access to the swivel element 30 within the interior of the electrical outlet box. The loosened access door fastener 44 further allows the access door to be moved away from the access opening 20 to provide further clearance to within the electrical outlet box, as shown in FIGS. 4 and 5. In either position, the swivel element 30 can then be lifted and removed from the mounting plate cup portion 28.

With the swivel element 30 removed from the mounting plate 12, the fixture wiring 19 is threaded through the central hole 41 of the swivel element and the top end of the fixture is connected to the swivel element connector 40. To hang the fixture from the mounting plate 12, the swivel ball 38 of the swivel element 30 is inserted into the opening 20 of the mounting plate and the narrower neck portion of the connector 40 of the swivel element is passed through the gap 36 of the mounting plate cup portion 28 while the swivel ball is elevated. Once the swivel element 30 is centrally oriented with respect to the mounting plate cup portion 28, the swivel element can be lowered until the swivel ball 38 rests against the semi-spherical inner surface 32 of the cup portion and the connector portion 40 extends through the semi-circular opening 34.

Once the swivel element 30 is seated within the mounting plate cup portion 28, the fixture can be released so that it hangs from the mounting plate 12. While the fixture is in this position, the installer has two hands free and clear access to the fixture wiring 19 and the electrical outlet box wiring 18 to make all the necessary electrical connections. After the electrical connections are made, the access door 14 is moved back into its intermediate position over the mounting plate access opening 20 and slid radially inwardly into its closed position thereby fully covering the access opening of the mounting plate and retaining the swivel element in the assembly. When sliding the access door 14 radially inwardly, the access door retaining tabs 48 formed on the mounting plate 12 capture the access door to prevent any rotation. The access door fastener 44 is then tightened to secure the access door 14 to the mounting plate 12. After the access door 14 has been secured, the mounting plate 12 can be finally adjusted to ensure that the bottom opening of the electrical outlet box is fully covered. At this point, the screws 26 for securing the mounting plate 12 to the electrical outlet box 16 can be fully tightened and the installation is complete.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A swivel hanger assembly comprising:
    a mounting plate mountable to an electrical outlet box, said mounting plate having a central opening forming at least part of a swivel element seat and further having a portion thereof removed to define an access opening within said mounting plate;
    a swivel element movably seated in said swivel element seat and partially protruding through said central opening of said mounting plate; and
    an access door slidably attached to said mounting plate, said access door being sized and shaped to fully cover said access opening of said mounting plate when said access door is in a closed position and further being slidable on said mounting plate in a radial direction toward said central opening to said closed position thereby movably retaining said swivel element within the swivel hanger assembly.

2. A swivel hanger assembly as defined in claim 1, wherein said access door is movable between said closed position and an open position, said access opening of said mounting plate being uncovered when said access door is in said open position thereby providing access to electrical wiring within the electrical outlet box.

3. A swivel hanger assembly as defined in claim 1, wherein said access door includes a radially oriented slot formed therethrough and said mounting plate includes a fastener threadably fastened thereto and slidably seated within said slot of said access door, said fastener being tightenable to secure said access door in said closed position.

4. A swivel hanger assembly as defined in claim 3, wherein said fastener permits said access door to be first slid radially outwardly from said closed position away from said swivel element and then moved away from said access opening of said mounting plate into an open position thereby uncovering said access opening to provide access to electrical wiring within the electrical outlet box.

5. A swivel hanger assembly as defined in claim 4, wherein said fastener permits said access door to hang from said mounting plate in said open position.

6. A swivel hanger assembly as defined in claim 3, wherein said slot is keyhole shaped to permit detachment of said access door without removing said fastener.

7. A swivel hanger assembly as defined in claim 3, wherein said slot includes a deformation formed therein which engages said fastener for preventing said access door from being slid radially outwardly when said fastener is tightened.

8. A swivel hanger assembly as defined in claim 1, wherein said mounting plate includes at least one tab formed thereon, said access door being slidable under said tab to be retained thereby in said closed position.

9. A swivel hanger assembly as defined in claim 1, wherein said swivel element includes a relieved portion facing said access opening of said mounting plate for providing additional access to electrical wiring within the electrical outlet box.

10. A swivel hanger assembly as defined in claim 1, wherein said swivel element and said swivel element seat include structure for preventing the swivel element from rotating.

11. A swivel hanger assembly as defined in claim 1, wherein said access door includes a domed portion and said mounting plate includes a cup portion, said domed portion and said cup portion together forming said swivel element seat.

12. A swivel hanger assembly comprising:
    a mounting plate mountable to an electrical outlet box, said mounting plate having a central opening forming at least part of a swivel element seat and further having a portion thereof removed to define an access opening within said mounting plate;
    a swivel element movably seated in said swivel element seat and partially protruding through said central opening of said mounting plate; and
    an access door movably attached to said mounting plate, said access door being movable between an open position wherein said access door hangs from said mounting plate away from said access opening thereby leaving said access opening uncovered, an intermediate position wherein said access door substantially covers said access opening of said mounting plate and a closed position wherein said access door retains said swivel element within the swivel hanger assembly.

13. A swivel hanger assembly as defined in claim 12, wherein said mounting plate includes a fastener fastened thereto, said access door being movable about said fastener of said mounting plate between said open position and said intermediate position and radially slidable with respect to said fastener of said mounting plate between said intermediate position and said closed position.

14. A swivel hanger assembly as defined in claim 13, wherein said access door is movable about said fastener of said mounting plate in two directions between said open position and said intermediate position.

15. A swivel hanger assembly as defined in claim 13, wherein said fastener of said mounting plate is tightenable to secure said access door in said closed position.

16. A swivel hanger assembly as defined in claim 13, wherein said access door includes a radially oriented slot formed therethrough, said fastener of said mounting plate being slidably seated within said slot.

17. A swivel hanger assembly as defined in claim 16, wherein said slot includes a deformation formed therein which engages said fastener for preventing said access door from being slid radially outwardly from its closed position.

18. A swivel hanger assembly as defined in claim 12, wherein said mounting plate includes at least one tab formed therein, said access door being slidable under said tab to be retained thereby in said closed position.

19. A method for mounting a hanging fixture to an electrical outlet box comprising the steps of:
    mounting a mounting plate to a bottom open face of an electrical outlet box, said mounting plate having an access opening formed therein for permitting access to electrical wiring within the interior of the electrical outlet box and further having a central opening forming at least part of a swivel element seat;
    attaching a swivel element to the hanging fixture;
    hanging said swivel element from said swivel element seat of said mounting plate;
    electrically connecting wiring within the electrical outlet box to the hanging fixture;
    pivoting an access door about a fastener of said mounting plate into an intermediate position wherein said access opening of said mounting plate is substantially covered by said access door; and
    sliding said access door radially inward with respect to said fastener toward said central opening of said mounting plate wherein said access door retains said swivel element within said mounting plate.

20. A method for mounting a hanging fixture to an electrical outlet box as defined in claim 19, wherein said access door is pivoted in two directions about said fastener of said mounting plate into said intermediate position.

* * * * *